Figure 1:
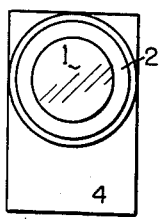

April 12, 1966  L. L. MORRISON ETAL  3,246,319
RECTANGULAR ENCAPSULATED PANEL MOUNTING
ELECTRICAL CIRCUIT AND INDICATING
LAMP ASSEMBLY
Filed May 20, 1963

INVENTORS
LAWRENCE L. MORRISON
RICHARD D. ADAMS
BY
Harry R. Lubcke
AGENT

United States Patent Office 3,246,319
Patented Apr. 12, 1966

3,246,319
RECTANGULAR ENCAPSULATED PANEL MOUNTING ELECTRICAL CIRCUIT AND INDICATING LAMP ASSEMBLY
Lawrence L. Morrison, Anaheim, and Richard D. Adams, Tustin, Calif., assignors to Electronic Engineering Company of California, Santa Ana, Calif., a corporation of California
Filed May 20, 1963, Ser. No. 281,395
3 Claims. (Cl. 340—381)

Our invention relates to a visual indicator for indicating the status of an electrical circuit and particularly to such an indicator which also includes an electrical circuit within a small encapsulation that forms the body of the indicator.

The use of illuminable indicators for indicating the status of complex electrical circuits in present-day electrical equipment is well established. It is always desirable, however, that such indicators occupy as little space as possible, particularly the space behind the panel upon which a plurality of indicators may be mounted. It is also desirable that each indicator be so shaped that one may be positioned close to another, side to side, and in adjacent rows, so as to conserve front panel area.

Typically, the art has heretofore provided indicators which are of a generally cylindrical shape and which extend relatively very far behind the panel upon which they are mounted.

We have departed from the art in encapsulating an indicator and its actuating circuit in a rectangular parallelepiped volume. The volume is roughly cubical in a preferred form, with two dimensions exceeding the minimum dimension by only 50%. Furthermore, the bushing which extends through the panel and contains the illuminating means is asymmetrically positioned on one of the four rectangular faces of the encapsulated body. This allows indicators to be closely positioned one to the other in a row and by orienting the major part of the body away from the common boundary between two rows this allows two rows of indicators to be relatively very closely positioned together. A plurality of electric terminals protrude from the rear face of the parallelepiped, this being the face opposite to that carrying the bushing.

In forming the encapsulation we have found that unless the indicating lamp is fastened to the components of the electrical assembly by flexible conductors it will fracture or otherwise become improperly included in the finished product. Additionally, a resilient sleeving over the bushing suitably terminates the molding material in the encapsulating process and allows the production of a product devoid of flash.

An object of our invention is to provide a visual indicator device having the volume thereof disposed to conveniently allow its physical incorporation in apparatus with which it coacts.

Another object is to provide a visual indicator which occupies a minimum space behind the panel upon which it is mounted.

Another object is to provide an indicator which allows minimum spacing between individual units and between two rows of individual units.

Another object is to provide a process by which a fragile component may be safely encapsulated.

Another object is to provide a process by which flash is essentially eliminated in encapsulation.

Other objects will become apparent upon reading the following detailed specification and upon examining the accompanying drawings, in which are set forth by way of illustration and example certain embodiments of our invention.

Figure 2:
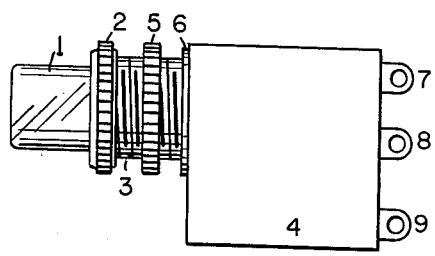
Figure 3:
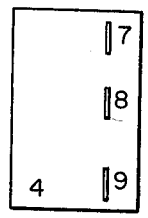
Figure 5:
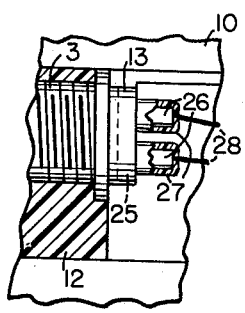
Figure 4:
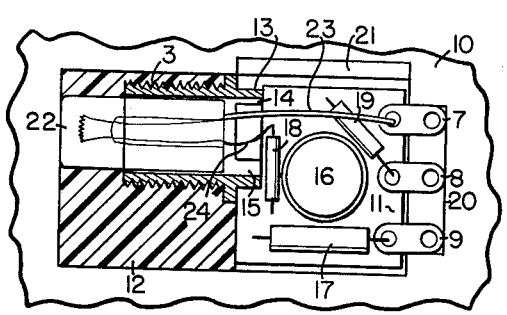

FIG. 1 shows a front elevation view of our device,
FIG. 2 shows a side elevation view of the same,
FIG. 3 shows a rear elevation of the same,
FIG. 4 shows an assembly within a mold prior to encapsulation; the elements at the left half of the figure being shown in section for clarity, and
FIG. 5 shows a modification of the assembly of FIG. 4 in fragmentary fashion.

In FIGS. 1 and 2 numeral 1 indicates a translucent cup or cap which comprises the front of our indicator and normally extends through a hole in a panel that is employed in the overall apparatus. This cap may be of plastic, typically milk white, but may have a color included therewithin for coding of the indication. The cap has a small flange at its rearward extremity that fits within retaining nut 2. The retaining nut screws on a threaded bushing 3. This bushing is molded into the main body 4 of our encapsulation. An additional milled nut 5 is normally provided upon threaded bushing 3 and the panel of the overall apparatus (not shown) is held between nuts 2 and 5. A shoulder 6 is machined at the end of the threaded bushing 3 so that in case the panel or other structural piece would extend to that shoulder, the shoulder would take the stress and not molded encapsulation 4.

It is always necessary to make electrical connection to the electric illuminating means within cap 1 so that this means may be suitably energized. More particularly, in the typical device of our invention there is also provided an electrical circuit within body 4. This circuit is included to accept a control signal intended to result in a visual indication, which signal is of relatively feeble character and to amplify the same to suitably actuate the electric illuminating means mentioned. Normally, this circuit is a transistorized amplifier, but it may be another circuit, such as an oscillatory circuit or a relaxation oscillatory circuit. Examples of the latter are the known flip-flop, one-shot multivibrator or equivalents lying within the genus indicated.

In any event, a set of terminals 7, 8 and 9 are provided for accomplishing the introduction of control electrical impulses and of electrical energy to energize the illuminating means and/or the electrical circuit. These are shown of the solder-tab variety in the figures and are spaced as is convenient for internal and external connection. Equivalent terminals in the form of cylindrical pins and at other spacings may be used instead.

It will be understood that the showings of FIGS. 1, 2 and 3 are of the completed encapsulated indicator having our novel shape and configuration. In FIG. 4 is shown a typical arrangement of components within a mold before the encapsulation take place, by means of which figure the novel steps in our process for manufacturing the indicator may be described.

In FIG. 4 the lower or main part of an encapsulation mold of steel is shown fragmentarily at 10. This has a rectangular cavity extending from right to left to include an insulating circuit board 11 and also a semiresilient block 12. The purpose of the latter is to hold bushing 3 in place and for that purpose the block is shown threaded to receive the threaded embodiment of the bushing. A nonthreaded extension of bushing 3 is seen at 13. This serves to support board 11 prior to encapsulation and to anchor the bushing in the encapsulation after the process has been completed.

Terminals 7, 8 and 9 are attached to the upper surface of board 11 by rivets, for example. It will be noted from FIG. 3 that these terminals are not central with respect to the thickness of the completed encapsulation, but are below center when referred to their position in mold 10.

Accordingly, board 11 fits into extension 13 across a chord below the horizontal diameter of bushing 3. The part of the board which fits therein is identified as 14 in FIG. 4. This fit is made possible by a slot 15 and the omission of the corner adjacent to part 14 of board 11.

A typical amplifier circuit is represented in FIG. 4 by transistor or other semiconductor active element 16, by large resistor 17 and by small resistors 18 and 19. This assembly may be accomplished by employing known circuit board type connections in combination with dip-soldering. The soldered connections are on the under side of the board and thus are not seen in FIG. 4.

Terminals 7, 8 and 9 are physically accommodated in the mold by a shallow milled-out subcavity 20. An injection gate 21 is provided along the upper edge of the mold through which encapsulation material is introduced. It will be noted that board 11 is small on all sides relative to the size of the mold so that the board is fully encapsulated in the processing.

An illuminating means, shown as incandescent lamp 22, is positioned within bushing 3 of FIG. 4. The lamp is an easy slide fit within the bushing, yet is such as to prevent the encapsulating material from flowing around the lamp. The lamp is electrically connected by leads 23 and 24. In the circuit shown the former lead connects to terminal 7 and is provided with insulation, whereas the latter lead connects to the adjacent terminal of resistor 18 and is not insulated other than by the encapsulation material which subsequently flows around it. Both wires are flexible and the lamp is not attached to board 11 in any way.

We found it necessary to make the lamp relatively mechanically independent of the board in order to carry out successful encapsulation of the whole. If this step in the processing was not observed the lamp was fractured or was otherwise improperly included in the finished product.

The incandescent lamp shown in FIG. 4 is usually employed with transistorized circuitry in view of the relatively low operating voltages provided for the operation of such circuitry. However, the lamp may be of the neon type, a small gaseous thyratron or an electroluminous device. An example of the latter is an element having a layer or layers of fluorescent material, which material luminesces upon having electrical energy impressed upon it.

In manufacturing the indicator according to our process, the assembly is made as has been set forth in connection with the description of FIG. 4. The mold 10 is then placed in an encapsulating press, between the flat parallel plates thereof and is tightly clamped. An initially powdered epoxy is made molten in accordance with known molding technique and is forced into the cavity. A pressure of the order of 480 pounds per square inch is employed for curing at 250° F. for a period of time within the range of from two to five minutes.

Either A, B or C stage epoxy material may be employed, depending upon general conditions important to the processor who is manufacturing our encapsulated device.

The slight flash remaining from injection gate 21 is easily broken off and leaves an essentially invisible parting line. There are no other bits of flash produced according to our molding method. The finished encapsulation is therefore polished externally by the encapsulating process per se. It will be noted that an insulating liner is not required around the circuit components; the encapsulation provides both the outer body and suitable insulation protection at one time.

While there is a trend toward manufacturing a completely unified indicator assembly that is discarded as a whole upon becoming defective, our assembly may be manufactured with a socket, say of the pin type, to allow insertion and removability of the visual indicating means, hence renewal of the same during the use of the indicator. This modification is shown in FIG. 5.

In FIG. 5, mold 10, bushing 3, bushing rear projection 13 and semiresilient block 12 are the same as in FIG. 4. However, a disk of insulating material 25 is positioned within projection 13 as indicated in dotted form, or hollow contacts 26 are otherwise held in position for encapsulation. These contacts are spaced to receive male pins attached to an indicating lamp, not shown, which is subsequently pushed into the hollow contacts 26 for making a removable connection in essentially the same manner as a lamp and socket is usual construction.

Importantly, silastic (synthetic) rubber sleeves 27 are placed over hollow contacts 26 for the entire length thereof. This is to provide a slight resilience in the socket thus formed to accommodate slightly off-standard pin placement in various individual lamps.

Electrical connections are also made to contacts 26, and these are indicated at 28. When encapsulation takes place, all of this part of the cavity is filled solid with encapsulating material and then the resilience of sleeves 27 is effective. Sleeves 27 also extend around the bottom of contacts 26 to prevent the encapsulating material from flowing into the hollow part of these contacts.

In addition to the specific materials and arrangements set forth above it will be understood that modifications may be made within the scope of our invention.

The semiresilient block 12 may be formed from silastic rubber instead of from Teflon.

A simple push-through (the panel of the apparatus) type of bushing may be employed instead of the threaded elements 3 and 5.

The advantages of our stubby and offset form of indicator assembly will be fully understood from what has been previously set forth in this specification. Of course, the proportions shown may be varied within the scope of our invention.

Similarly, details in the steps of the process of manufacturing may also be altered without departing from the scope of this invention.

Having thus fully described our invention and the manner in which it is to be practiced, we claim:

1. An electrical indicator assembly for panel mounting comprising;
  (a) an encapsulated housing of insulating material in the form of a stubby parallelepiped of rectangular cross-section having a major dimension substantially greater than its minor dimension,
  (b) a single panel-engaging bushing projectingly attached to the rectangular front face of said parallelepiped near one end of said major dimension thereof,
  (c) a plurality greater than two of electrical terminals projectingly disposed from the rear face of said parallelepiped,
  (d) electrical illuminating means disposed within said bushing, and
  (e) an electrical circuit means connected between said terminals and said illuminating means to enhance the level of electrical energy applied to said terminals and provide constant illumination while said terminals are electrically energized;
  said electrical circuit means fixedly contained immobile within said housing, and said illuminating means, bushing and terminals contained immobile within said housing,
  said electrical circuit means being mounted upon a planar insulating piece aligned with said major dimension and having a portion engaging said bushing for positioning the elements of said indicator assembly for encapsulation,
  said planar insulating piece having said electrical terminals fixedly secured thereto linearly aligned along said major dimension to extend outward said housing nearer one side of said rear face than the opposite side of said rear face.

2. The indicator assembly of claim 1 in which
(a) said illuminating means is an incandescent lamp connected to one of said plurality of terminals and to an element of said electrical circuit means for constant direct current energization thereby upon electrical energization of all of said plurality of terminals.

3. The indicator assembly of claim 1 in which
(a) said electrical illuminating means includes a lamp with pins and a socket with contacts,
said contacts connected to said electrical circuit means, and
(b) resilient sleeves surrounding said contacts to resiliently accommodate the pins of said lamp in said socket within said housing.

References Cited by the Examiner
UNITED STATES PATENTS

| | | | |
|---|---|---|---|
| 2,740,111 | 3/1956 | Bogue et al. | 340—381 |
| 2,742,636 | 4/1956 | Alden | 340—381 |
| 2,784,398 | 3/1957 | Mysse | 340—381 |
| 2,790,094 | 4/1957 | Smith | 307—157 |
| 2,882,521 | 4/1959 | Salzer et al. | |
| 2,910,688 | 10/1959 | Kelley et al. | 340—384 |
| 2,957,072 | 10/1960 | Rigiel | 240—2 |
| 2,975,487 | 3/1961 | Williams | 264—272 |
| 2,977,581 | 3/1961 | Rogers | 340—331 |
| 2,985,874 | 5/1961 | Williams | 340—266 X |
| 3,012,273 | 12/1961 | Lewis | 264—272 |
| 3,031,655 | 4/1962 | Temple et al. | 340—381 |

NEIL C. READ, *Primary Examiner.*

W. C. GLEICHMAN, I. J. LEVIN, *Assistant Examiners.*